US006058588A

United States Patent [19]
Wadensten

[11] Patent Number: 6,058,588
[45] Date of Patent: May 9, 2000

[54] TOOL AND METHOD FOR USE WITH A REMOVABLE RAILROAD CAR VIBRATOR

[76] Inventor: Theodore S. Wadensten, 75 Stillson Ave., P.O. Box 8, Wyoming, R.I. 02898

[21] Appl. No.: 09/340,373

[22] Filed: Jun. 28, 1999

[51] Int. Cl.[7] .............................. B23P 11/00; B23P 19/04
[52] U.S. Cl. .............................. 29/426.5; 29/256; 29/257
[58] Field of Search .............................. 29/426.5, 256, 29/257, 281.5; 269/43, 287, 249

[56] References Cited

U.S. PATENT DOCUMENTS

| | | | |
|---|---|---|---|
| 2,113,755 | 4/1938 | Billington . | |
| 3,003,733 | 10/1961 | Peterson . | |
| 3,463,431 | 8/1969 | Matson | 414/375 |
| 3,670,389 | 6/1972 | Shepanski | 29/256 |
| 4,195,828 | 4/1980 | Peterson | 269/43 |
| 4,441,844 | 4/1984 | Miller | 414/117 |
| 4,691,907 | 9/1987 | Yang | 269/249 |
| 5,312,097 | 5/1994 | Womack | 269/249 |
| 5,560,091 | 10/1996 | Labit, Jr. | 269/43 |
| 5,779,427 | 7/1998 | Heffinger | 414/375 |

*Primary Examiner*—S. Thomas Hughes
*Assistant Examiner*—Eric Compton
*Attorney, Agent, or Firm*—Patrick J. Pinto

[57] ABSTRACT

A tool 10 and method for its use with a vibratory car shaker mounting bracket 40 that includes a cross bar member 12, a pair of first bar members 14, an engaging means 22, a pin member 24, a retaining means 26 and at least two threaded jacking means 34. each of the threaded jacking means being carried by the cross member 12, A male blade portion 52 of the mounting bracket 40 being removably seated in a female pocket portion 50. The tool being arrayed for straddling a web portion 54 of the blade portion 52 while and when the pin member 24 carried in and by the first bar members 14 abuts a selected portion of the web 54 while one end 62 of each of said jacking means 34 is advanced to and towards a selected surface of the female pocket portion 50 for providing a relative movement or lack thereof between the male blade portion 52 and the female pocket portion 50

18 Claims, 2 Drawing Sheets

TOOL AND METHOD FOR USE WITH A REMOVABLE RAILROAD CAR VIBRATOR

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

With regard to the classification of art, this invention is believed to be found in the general class containing tools for applying a pushing or pulling force and more particularly to those subclasses pertaining to tools and methods for use with detachable vibratory railroad car shakers.

2. Description of Related Art Including Information Disclosed under 37 CFR 1.97 and 1.98

Detachable vibratory railroad car shaker apparatus are known in the field. Exemplary brackets for the removable mounting of a vibrator to a railroad car are disclosed in U.S. Pat. No. 3,003,733 that issued to Petersen on Oct. 10, 1961; and U.S. Pat. No. 3,463,431 issued to Matson on Aug. 26, 1969. These patents disclose a common type of separable male/female bracket arrangement. Usually the female portion of the bracket is attached to a hopper portion of a railroad car. This type of bracket is sometimes referred to as a Gardner or Tyler type and generally has C-shaped seat or pocket portion (i.e. a wedge, dovetail or the like.) The male portion generally may be characterized as a T-shape that has a blade member (i.e. male wedge, male dovetail or the like) and a reduced connector portion (i.e. web, neck, leg and the like) U.S. Pat. No. 3,003,733 also discloses a wedge shaped tool for separating the male portion from the female portion of the bracket. U.S. Pat. No. 5,779,427 that issued to Heffinger on Jul. 14, 1998 discloses a powered means for insertion and removal of the male portion or half of the bracket into the female portion or half of the bracket. U.S. Pat. No. 3,463,431 discloses a threaded means for retaining the male portion of the bracket in the female portion of the bracket.

As previously mentioned above, the female portion of the bracket is usually fixed to the railroad car by a suitable means such as welding and the like and therefore remains with the railroad car as it is moved to various yards, unloading sites or locations. Whereas the male half of the bracket is usually intended to remain at a particular site for unloading the railroad car. It can be appreciated that in use, the female portion of the bracket and the male portion may not be exactly mated because they come from different bracket manufacturers, car shaker manufactures and/or in fact one or both of the parts of the bracket may be worn or oxidized. It can be also appreciated that the vibrator action may in fact cause the male and female portions to further lock together. Many times the male portion of the bracket is an integral part of the vibrator housing. It is common practice for a railroad work gang or crew to attempt to remove the vibrator from the car by means of a heavy hammer. It has been found that the railroad crews have bent the wedge disclosed in U.S. Pat. No. 3,003,733 thereby rendering it unusable for its intended use. If the crew is unsuccessful in removing the vibrator from the car, the vibrator will then travel with the railroad car to a new location. The work gang or crew may or may not have a spare vibrator to attach to another railroad car to be unloaded. The work gang may never see the vibrator again. Any permanent loss of the vibrator results in a loss of inventory and money. Permanent or temporary loss of a vibrator requires that spare vibrators be on hand thereby adding to operating costs. It has been determined that there is still a need to provide a tool that is useable with various combinations of male bracket portions and female bracket portions. The desired tool must be easy to use and perform the function for which it has been made. The needed tool must also be economical to manufacture. The present invention provides such a tool and satisfies the identified need.

BRIEF SUMMARY OF THE INVENTION

The present invention may be briefly described with respect to its objects. It is an object of this invention to provide and it does provide a tool and method for its use that reliably releases, detaches or unseats a male portion of a bracket that is wedged or locked into a female portion of the bracket.

It is another object of this invention to provide and it does provide a tool that is economical to manufacture and use.

It is still another object of this invention to provide and it does provide a versatile tool and method for its use which may be used with various combinations of detachable mounting brackets for vibratory car shakers.

One embodiment of the present invention may be briefly described as: a tool for use with a vibratory car shaker mounting bracket assembly, the mounting bracket assembly having a male blade portion that removably seats into a mating female pocket portion, the tool including: a) a cross bar member having a pair of first bar members attached thereto and extending therefrom in a substantially T-shaped configuration, the first bar members being arrayed in a predetermined spaced relationship, the predetermined spaced relationship allowing for a straddling of a web or neck member of the male blade portion, each of the first bar members being elongated and having a major axis, each of the first bar members having at least one transverse aperture formed therein and therethrough and the transverse apertures being aligned in pairs on a common axis for forming an engagement means, the cross bar member further including at least two threaded jacking means, preferably each threaded jacking means including a threaded aperture formed in the cross bar member. An axis of the threaded apertures being selectively aligned with the major axis of the first bar members for alignment with a selected surface of the female pocket portion of the mounting bracket assembly, b) each of threaded jacking means further including an elongated threaded bolt being sized for mating with and threading into the threaded apertures of the cross bar member; c) an elongated pin member being sized to fit into the engagement means, the pin member further including at least one removable retaining means, the pin member being of a sufficient length for being simultaneously engaged in the engagement means while being retained therein by the retaining means; and wherein the web or neck member of the male portion is selectively placed between the first bar members with the elongated threaded bolts being simultaneously aligned with the selected surface of the female portion, and the elongated pin member being selectively placed and retained by and in the engagement means so that the elongated pin will abut a selected portion of the web member of the male portion as and when one end of each threaded jacking means is advanced to and towards the selected surface of the female pocket portion thereby providing an urging force to provide relative movement of the male blade portion with respect to the female pocket portion.

The tool of the present invention also suggests a method for its use that may also be characterized as: a method of unseating a male blade portion from a female pocket portion of a separable mounting bracket assembly for a vibratory car shaker including the steps of: a) providing a tool having a substantially T-shaped configuration being formed by a pair of elongated first bar members that are fixed to a cross bar member, each of the pair of first bar members being selectively aligned and arrayed in a spaced relationship that is sufficient to straddle a web member of the male blade portion, the first bar members having an engagement means including a pair of transverse apertures selectively formed therein and therethrough on a common axis, the tool further including a pair of threaded jacking means and an elongated pin member, each threaded jacking means further including a threaded bolt being adapted for threading into a threaded aperture formed in the cross bar member, each threaded aperture being selectively aligned with a major axis of the first bar members, the elongated pin member having at least one removable retaining means; b) placing the tool onto and over the male blade portion so that the first bar members straddle the web member, while simultaneously and selectively aligning the one end of each threaded jacking means with a top surface of the female pocket portion; c) selectively inserting the elongated pin into the engagement means, then subsequently positioning the retaining means therein and thereon, d) advancing and urging the one end of each of the threaded jacking means against the top surface of the female pocket portion by threading the threaded bolts into the threaded apertures in substantially equal increments so that the elongated pin will abut a selected portion of the web member, subsequent and selective continued threading of the bolts into the threaded apertures causing relative movement between the male blade portion and the female pocket portion.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode of the present invention. These specific embodiments, as shown in the accompanying drawings, may also include diagrammatic symbols for the purpose of illustration and understanding.

BRIEF DESCRIPTION OF THE SEVERAL VIEW OF DRAWINGS

Figure 3:
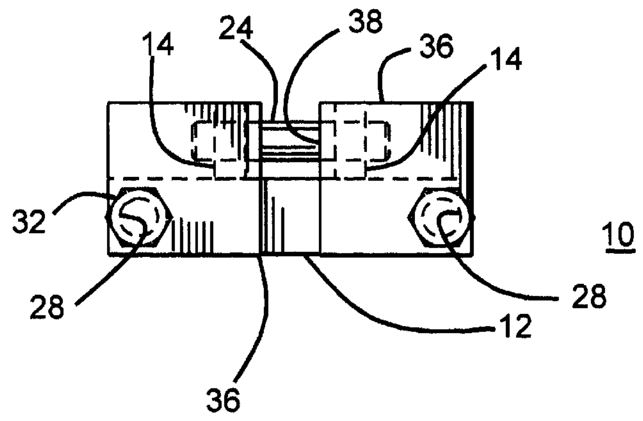
FIG. 3 represents a top elevation of the present invention.

In the following description and in the appended claims, various components and details of construction are identified by specific names for convenience. These names are intended to be generic in their application while differentiating between the various components and details. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Figure 1:
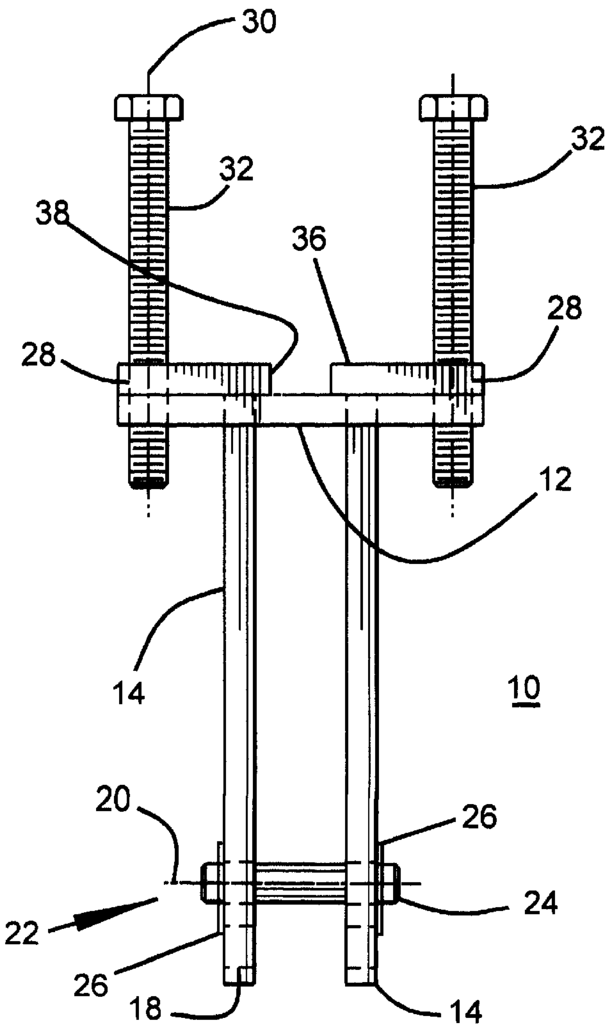
FIG. 1 represents a front elevation of a tool of the invention.
Figure 2:
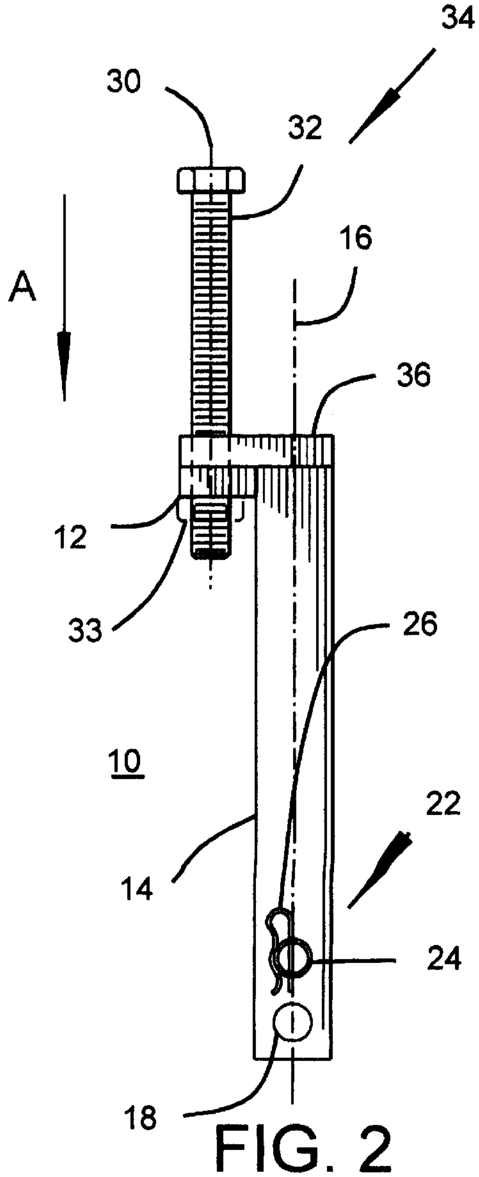
FIG. 2 represents a side elevation of the present invention.

Referring to the drawings and in particular to FIGS. 1 through 3, a tool assembly of the present invention is generally identified as 10. The tool assembly 10 includes a cross bar member 12 and a pair of first bar members 14 extending therefrom in a substantially T-shape configuration, as may be seen in FIG. 1. The first bars 14 are arrayed in a selected spaced relationship. The selected spaced relationship, its purpose and use will be discussed below. Preferably, the first bars 14 must be fixed or attached to the cross bar member 12 by a suitable attaching means such as welding or the like. Alternatively the cross bar member 12 and the first bar members 14 may be formed of a unitary construction such a molding or casting. It is also preferred that the cross bar member 12 and the first bar members 14 be formed of a structural metal that is suitable for the designed loading. The first bar members 14 may be characterized as having a major axis 16 that is elongated and may be more clearly seen in FIG. 2.

Each of the first bar members 14 includes at least one transverse aperture 18 that is formed therein and therethrough on the major axis 16. The transverse apertures 18 of each of the first bar members 14 are aligned on a common axis 20 and in pairs to form an engaging means 22. It has been found that providing the first bar members 14 with at least 2 pairs of engaging means 22 satisfies most applications of the tool of the present invention with known brackets. The transverse apertures 18 are sized for removably seating a pin member 24 therein. The pin member 24 should be of sufficient length so as to be engaged simultaneously by both first bar members 14 in a clevis-like fashion. The pin member 24 preferably includes at least one removable retaining means 26 such as a cotter pin, a hair pin cotter pin and the like. The pin member 24 may have two removable retaining means as shown in FIG. 1. Alternatively one end of the pin member 24 may include an enlarged head portion, seen in FIG. 5, that acts as a non-removable retaining means and the distal end of the pin member 24 is configured for a removable retaining means 26. As a second alternative, a threaded bolt and nut arrangement, not shown, may be substituted for the pin 24 and retaining means 26 that is depicted in the drawings.

Referring again to FIGS. 1–3, in this first and preferred embodiment of the tool 10, the cross bar members 12 further include a pair of threaded apertures 28 that are formed therein and therethrough. Each of the threaded apertures 28 includes a centerline or axis 30 that is offset a selected distance from the axis 16 of the first bar members 14. This selected offset distance and its use will be discussed below in connection with FIGS. 4–6. Threaded bolts 32 having a selected length and size are positioned in the threaded apertures 28 in a conventional manner to form a threaded jacking means 34. Alternatively the threaded jacking means 34 may include a threaded bolt 32 that is guided by a through non-threaded aperture in the cross bar member 12 rather than a threaded aperture 28. In this alternate arrangement at least one threaded nut 33, shown in dashed outline, will be positioned on the threads of the bolt 32 so that one end of the bold is advanced in a jacking fashion in the direction of arrow A. It is preferred that a reinforcing means 36 be also provided such as cast or molded pads, metal blocks or bars and the like that reinforce the attachment of the first bars 14 to the cross bar member 12. It is also preferred that the reinforcing means 36 be arrayed to provide a space or gap 38. This reinforcing means 36 will also provide a greater length for a guiding or bearing surface for the threaded bolt 32. The space or gap 38 and its purpose will be discussed below.

USE AND OPERATION

Figure 5:
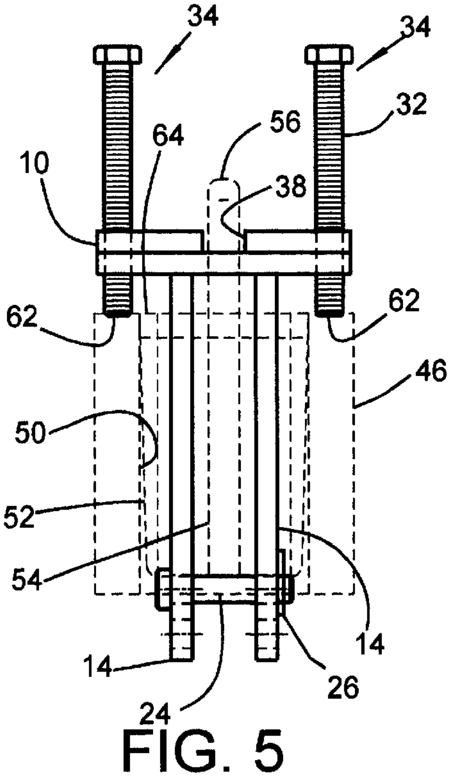
FIG. 5 represents a front elevation of present invention in use, this view being taken along line 5—5 of FIG. 4.
Figure 4:
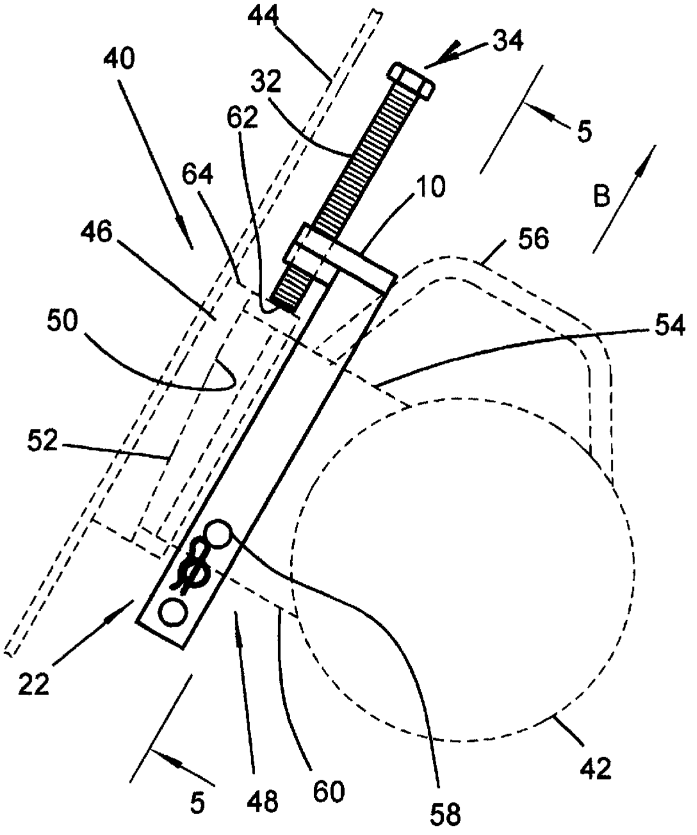
FIG. 4 represents a side elevation of present invention and its application or use.

Referring now to FIGS. 4 and 5, a mounting bracket generally identified as 40, shown in dashed outline, is provided for removably attaching or mounting a vibratory car shaker 42 to a wall 44 of a railroad car. The mounting bracket 40 generally includes a female portion 46 and a male portion 48. The mounting bracket 40 is commonly known as a Gardner or Tyler type. This type of mounting bracket may also be known as a wedge type, dove-tail-type and the like. The female portion 46 generally includes a C-shaped pocket portion 50 into which a T-shaped male blade member 52 of the male portion 48 is seated. The male portion 48 further includes a web, leg or neck portion 54 that is smaller in width than the blade member 52. The web 54 connects the vibrator 42 to the male blade member 52. The male portion 48 of the bracket 40 may be cast as an integral part of a vibrator 42. One non-limiting example of a this type of integral arrangement is Model CCW-5000 manufactured by Vibco Inc., Wyoming RI. Model CCW-5000 may also include an integral cast handle 56. The male blade member 52 may be configured as a self-locking wedge.

Still referring to FIGS. 4 and 5, the tool assembly 10, with the pin member 24 removed and one end 62 of each jacking means 34 in a retracted condition, is placed onto and over the web member 54. The web member 54 is straddled by the spaced first bar members 14, seen more clearly in FIG. 5. The spacing should be sufficient to allow easy straddling thereof while allowing a selected clearance therebetween. It has been found that a spacing in the neighborhood of 3.8 cm (1.5 in.) has provided satisfactory results with known brackets. The notched area or gap 38 provides clearance for the integral handle 56 of the vibrator 42 or a protruding portion of the web member 54 to pass therethrough. A notched area or gap 38 in the neighborhood of 2.5 cm. (1.0 in.) wide has been found to provide good results with known brackets. The pin member 24 is placed in a selected engagement means 22. The engagement means 22 may be aligned with a through aperture 58 in the web 54 or may be aligned with a bottom edge 60 of the web portion. Subsequently the removable retaining means 26 is positioned into the pin member 24. Finally one end 62 of each of the threaded jacking means 34 is advanced in substantially equal increments to and towards a selected surface 64 of the female portion 46 to cause a substantially uniform relative movement, absent cocking, between the male portion 48 and the female portion 46. It is to be noted that the offset distance between axis 30 and major axis 16 must be sufficient for allowing engagement of the web member by the pin member while allowing the relative movement, in the direction of arrow B, of the male portion 48 with respect to the female portion 46. As a non-limiting example, it has been found that an offset distance in the neighborhood of 3.2 cm (1.25 in.) between major axis 16 and axis 30 has provided good results with known brackets when the major axis 16 is centrally located in a 3.2 cm. (1.25 in) wide first bar member 14. This example of an offset results in a throat distance of 1.6 cm (0.625 in.).

Figure 6:
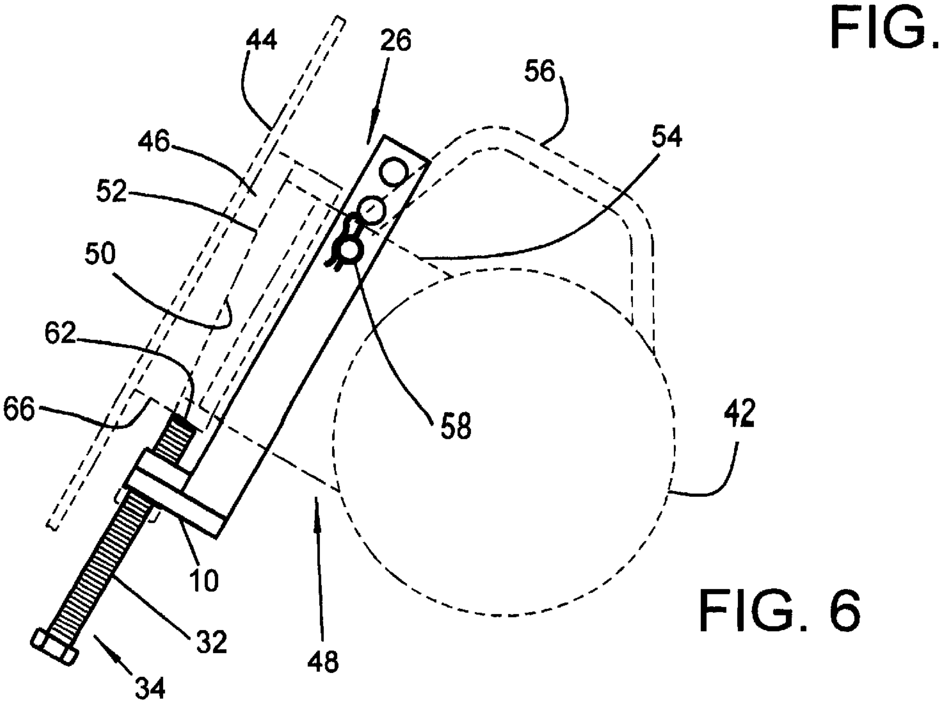
FIG. 6 represent a side elevation of an alternate use for the present invention.

As it was previously mentioned, the mounting bracket 40 is generally of a self-locking type and usually requires a forceful separation of the male portion 48 from the female portion 46. However if the male portion 48 does not self lock into the female portion 46, the tool of the present invention may be adapted for use in helping to maintain the engagement or seating of the male portion 48 within the female portion 46 by being applied in a reverse manner as shown in FIG. 6. The pin member 24 may be positioned in a through aperture in the web, similar to 58 when a handle 56 is present or abutted against a top edge 64 of the web or neck 54 when a handle is not present. The one end 62 of the jacking means 34 could be selectively advanced to abut a bottom surface 66 of the female portion 46 thereby providing the desired retention. In this arrangement at least one standard type of locking threaded nut, shown in dashed outline, should be used on each jacking means 34 for maintaining the set position.

Directional terms such as "front", "back", "in", "out", "downward", "upper", "lower" and the like may have been used in the description. These terms are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. A tool for use with a vibratory car shaker mounting bracket assembly, said mounting bracket assembly having a male blade portion that removably seats into a mating female pocket portion, said tool including:

a) a cross bar member having a pair of first bar members attached thereto and extending therefrom in a substantially T-shaped configuration, said first bar members being arrayed in a predetermined spaced relationship, said predetermined spaced relationship allowing for a straddling of a web member of the male blade portion, each of said first bar members being elongated and having a major axis, each of said first bar members having at least one transverse aperture formed therein and therethrough and said transverse apertures being aligned in pairs on a common axis for forming a pin engagement, the cross bar member further including at least two threaded jacks carried therein and therethrough, an axis of said threaded jacks being selectively aligned with the major axis of the first bar members for alignment with a selected surface of the female pocket portion of the mounting bracket assembly, b) each of said threaded jacks further including a female threaded portion and an elongated threaded bolt being sized for mating with and engaging therein and therethrough;

c) an elongated pin member being sized to fit into the pin engagement, said pin member further including at least one removable retainer, said pin member being of a sufficient length for being simultaneously engaged in the pin engagement while being retained therein by the retainer; and wherein the web member of the male portion is selectively placed between the first bar members with the elongated threaded bolts simultaneously aligned with the selected surface of the female portion, and said elongated pin member being selectively placed and retained by and in the pin engagement so that the elongated pin will abut a selected portion of the web member of the male portion as and when one end of said threaded bolts are advanced to and towards the selected surface of the female pocket portion by rotation of the threaded jacks for providing relative movement of the male blade portion with respect to the female pocket portion.

2. A tool as recited in claim 1 wherein the female threaded portion of each threaded jack is a threaded aperture in the cross bar member.

3. A tool as recited in claim 1 wherein said female threaded portion is a threaded nut.

4. A tool as recited in claim 1 wherein said pin member further includes an enlarged head portion and an end of said pin member distal to said enlarged head portion carries said removable retainer.

5. A tool as recited in claim 2 wherein said pin member further includes an enlarged head portion and an end of said pin member distal to said enlarged head portion carries said removable retainer.

6. A tool as recited in claim 3 wherein said pin member further includes an enlarged head portion and an end of said pin member distal to said enlarged head portion carries said removable retainer.

7. A tool as recited in claim 1 wherein said pin member includes two retainers, one of said retainers being removably mounted in a first end of said pin member and a second of said retainers being removably mounted in a second end of said pin member.

8. A tool as recited in claim 2 wherein said pin member includes two retainers, one of said retainers being removably mounted in a first end of said pin member and a second of said retainers being removably mounted in a second end of said pin member.

9. A tool as recited in claim 3 wherein said pin member includes two retainers, one of said retainers being removably mounted in a first end of said pin member and a second of said retainers being removably mounted in a second end of said pin member.

10. A tool as recited in claim 1 wherein a reinforcement is provided for reinforcing a connection of the each first bar member to the cross member.

11. A tool as recited in claim 2 wherein a reinforcement is provided for reinforcing a connection of the each first bar member to the cross member.

12. A tool as recited in claim 3 wherein a reinforcement is provided for reinforcing a connection of the each first bar member to the cross member.

13. A tool as recited in claim 1 wherein said tool includes a selectively sized notched area that is formed therein and thereon, said notched area being of a selected size and central to said predetermined spaced relationship of said first bar members for allowing a protruding portion of said male blade portion to pass therethrough.

14. A tool as recited in claim 2 wherein said tool includes a selectively sized notched area that is formed therein and thereon, said notched area being of a selected size and central to said predetermined spaced relationship of said first bar members for allowing a protruding portion of said male blade portion to pass therethrough.

15. A tool as recited in claim 3 wherein said tool includes a selectively sized notched area that is formed therein and thereon, said notched area being of a selected size and central to said predetermined spaced relationship of said first bar members for allowing a protruding portion of said male blade portion to pass therethrough.

16. A method of unseating a male blade portion from a female pocket portion of a separable mounting bracket assembly for a vibratory car shaker including the steps of:

a) providing a tool, said tool having a substantially T-shaped configuration formed by a pair of elongated first bar members that are fixed to a cross bar member, each of the pair of first bar members being selectively aligned and arrayed in a spaced relationship that is sufficient to straddle a web member of the male blade portion, said first bar members having a pin engagement formed by a pair of transverse apertures selectively formed therein and therethrough on a common axis, said tool further including a pair of threaded jacks and an elongated pin member, each of said threaded jacks including a threaded bolt being adapted for threading into a female portion of said threaded jacks, each of said threaded jacks being carried in and by the cross bar member, each of said threaded jacks being selectively aligned with a major axis of the first bar members, said elongated pin member having at least one removable retainer;

b) placing said tool onto and over the male blade portion so that the first bar members straddles said web member, while simultaneously and selectively aligning one end of said threaded bolts with a top surface of the female pocket portion;

c) selectively inserting said elongated pin into said pin engagement, then subsequently positioning said retainer therein and thereon, d) urging said one end of said threaded bolts against said top surface of the female pocket portion by rotation of one portion of said threaded jacks so that the elongated pin will abut a selected portion of the web member, subsequent and selective continued rotation of each threaded jacks causing a uniform relative movement between said male blade portion and said female pocket portion.

17. A method as recited in claim 16 wherein the female threaded portion of the threaded jacks is a threaded aperture in the cross bar member.

18. A method as recited in claim 16 wherein said female threaded portion is a threaded nut.

* * * * *